(12) United States Patent
Wiedemeier et al.

(10) Patent No.: US 10,461,464 B1
(45) Date of Patent: Oct. 29, 2019

(54) BI-DIRECTIONAL, ROTATING, PRESSURE BULKHEAD PENETRATOR

(71) Applicant: SPAWAR Systems Center Pacific, San Diego, CA (US)

(72) Inventors: Brandon J. Wiedemeier, San Diego, CA (US); Nathan Todd Miller, San Diego, CA (US); Kyle M. Hansen, San Diego, CA (US); Gregory W. Anderson, San Diego, CA (US)

( * ) Notice: Subject to any disclaimer, the term of this patent is extended or adjusted under 35 U.S.C. 154(b) by 0 days.

(21) Appl. No.: 16/273,304

(22) Filed: Feb. 12, 2019

(51) Int. Cl.
  *H01R 13/523* (2006.01)
  *H02G 15/013* (2006.01)
  *H02G 5/06* (2006.01)
  *H02G 3/22* (2006.01)
  *H01B 17/30* (2006.01)

(52) U.S. Cl.
  CPC ......... *H01R 13/523* (2013.01); *H01B 17/306* (2013.01); *H02G 3/22* (2013.01); *H02G 5/061* (2013.01); *H02G 15/013* (2013.01)

(58) Field of Classification Search
  CPC ........ H01R 13/523; H02G 3/22; H02G 5/061; H02G 15/013
  See application file for complete search history.

(56) References Cited

U.S. PATENT DOCUMENTS

| 3,825,320 | A | 7/1974 | Redfern |
| 3,951,515 | A | 4/1976 | Allard |
| 4,469,399 | A | 9/1984 | Cowen |
| 4,598,290 | A | 7/1986 | Collins |
| 6,039,324 | A | 3/2000 | Santa, Jr. |
| 6,215,065 | B1 | 4/2001 | Cox |
| 7,857,604 | B2 * | 12/2010 | Shaw .................... E21B 43/128 417/422 |
| 8,287,295 | B2 * | 10/2012 | Sivik ....................... H02G 3/22 439/271 |
| 8,968,018 | B2 * | 3/2015 | Sivik ....................... H02G 3/22 439/271 |
| 9,590,350 | B2 | 3/2017 | Plant |
| 9,774,131 | B2 * | 9/2017 | Painter ................... H01R 13/41 |

* cited by examiner

*Primary Examiner* — Briggitte R. Hammond
(74) *Attorney, Agent, or Firm* — Naval Information Warfare Center, Pacific; Kyle Eppele

(57) ABSTRACT

A bulkhead penetrator comprising a body having an interior and an exterior. An element having a first pressure is disposed within the body's interior in a first pressure region. An inner penetrator is configured to permit a transfer of the element from the body's interior past the physical boundary to the exterior of the body in a second pressure region having a second pressure, the inner penetrator having an interior surface exposed to the first pressure region and an exterior surface exposed to the second pressure region. An outer penetrator is configured to permit the transfer of the element from the interior of the body past the physical boundary to the exterior of the body in a third pressure region having a third pressure. An inner-outer connector connects the inner penetrator to the outer penetrator. Sealing mechanisms may prevent the transfer of the element from the first pressure region.

20 Claims, 5 Drawing Sheets

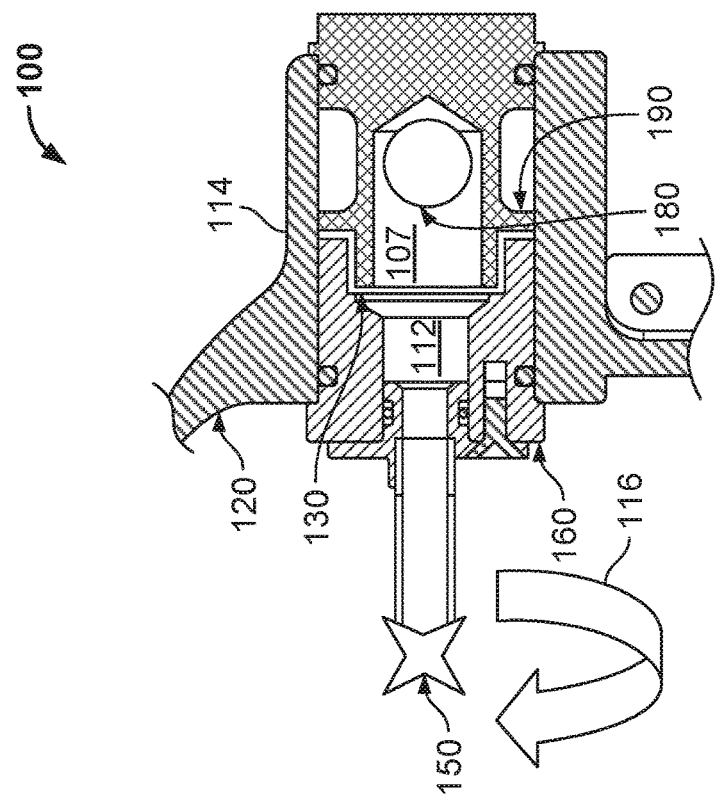
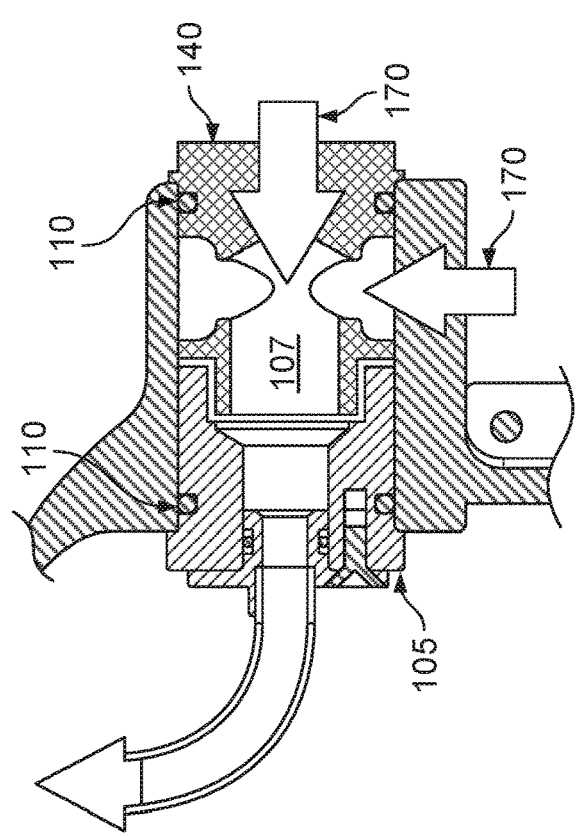
FIG. 1A
FIG. 1B

US 10,461,464 B1

BI-DIRECTIONAL, ROTATING, PRESSURE BULKHEAD PENETRATOR

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103772.

BACKGROUND OF THE INVENTION

Field of the Invention

The present disclosure relates generally to penetrators and, more particularly, to pressurized bulkhead penetrators.

Description of Related Art

Some devices include elbows or keyed connections that permit the devices to rotate to a certain degree. At times, it can be difficult to cause the device's rotation to go to a particular angle or orientation. For orientation of keyed or elbow connections, especially with national pipe thread (NPT) threads, it can be difficult to depend on the final angle of the feature, if a specific orientation is needed. Some end users may attempt to tighten the connection until it reaches a specific orientation. However, if done improperly, over-tightening of these connections may lead to cracking. On the other hand, if the connection is under-tightened to achieve the desired angle, leaking may result. Rotating to a specific angle or orientation is made especially difficult after assembly where it may be desirable to change the angle on either side of the bulkhead.

Penetrations into pressure vessels are typically done by threading directly into the bulkhead or with connectors that are specifically designed to handle pressure on both sides. However, design constraints may not allow these options.

There is a need for a bulkhead penetrator that can have one or both ends adjustable in terms of angle, and that can penetrate pressure vessels, and can have a pressure other than ambient on both sides of the bulkhead, or a fluid other than air on both sides, and additionally a different environment inside the penetrator than either side of the bulkhead.

SUMMARY OF THE INVENTION

The present disclosure addresses the needs noted above. Aspects of the present disclosure provide a bidirectional, rotating, pressure bulkhead penetrator. The bulkhead penetrator comprises a body having an interior surface and an exterior surface. An element is disposed within the interior of the body in a first pressure region, the element having a first pressure. An inner penetrator is configured to permit a transfer of the element from the interior of the body past the physical boundary to the exterior of the body in a second pressure region having a second pressure, the inner penetrator having an interior surface exposed to the first pressure region and an exterior surface exposed to the second pressure region.

An outer penetrator is configured to permit a transfer of the element in the first pressure region from the interior of the body past the physical boundary to the exterior of the body in a third pressure region having a third pressure. An inner-outer connector connects the inner penetrator to the outer penetrator. The bulkhead penetrator further includes at least two sealing mechanisms for the body, the at least two sealing mechanisms being configured to seal the first pressure region from the second pressure region and the third pressure region.

BRIEF DESCRIPTION OF THE DRAWINGS

The accompanying drawings, which are incorporated in and form a part of the specification, illustrate example embodiments and, together with the description, serve to explain the principles of the invention. In the drawings:

FIG. 1A illustrates a cutaway view of a bulkhead penetrator in accordance with aspects of the present disclosure.

FIG. 1B illustrates another cutaway view of the bulkhead penetrator of FIG. 1A in accordance with aspects of the present disclosure.

DETAILED DESCRIPTION

Aspects of the present disclosure provide a bulkhead penetrator.

Figure 2:
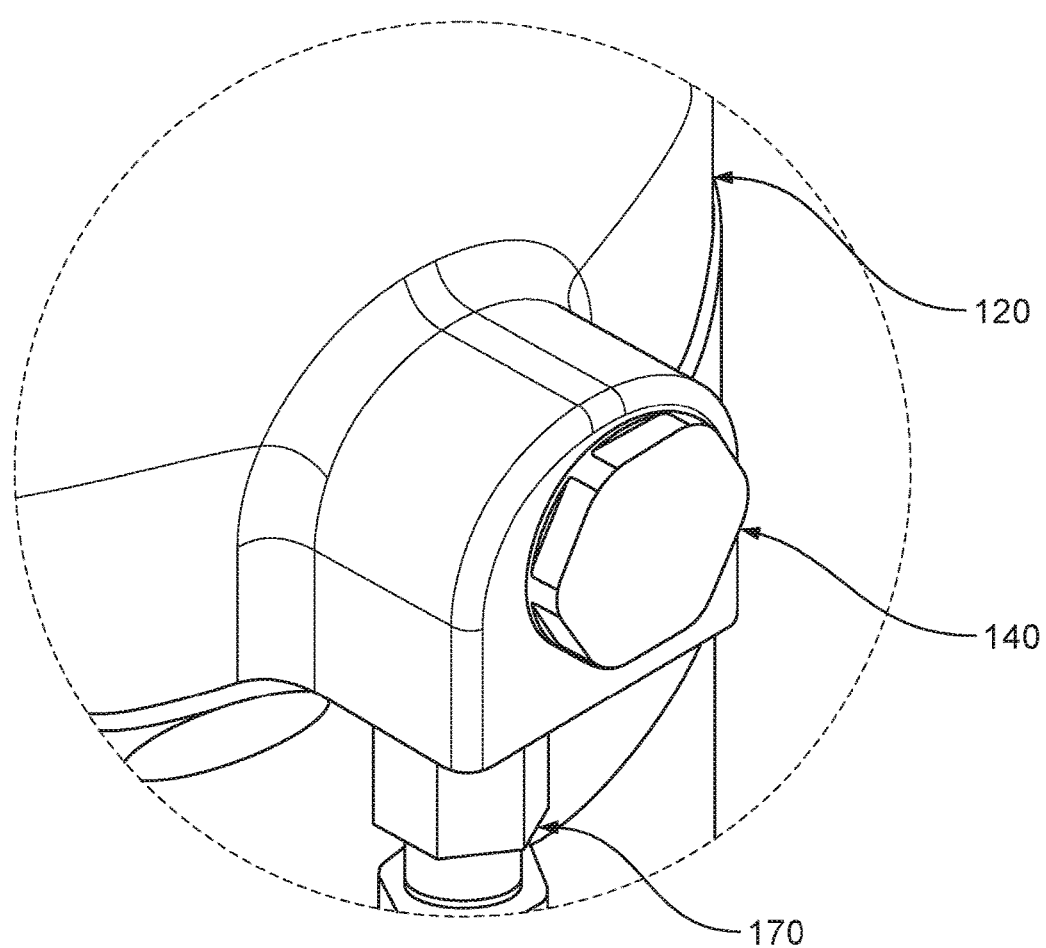
FIG. 2 illustrates a close-up view of a pressure vessel, an outer penetrator and an input-output path in accordance with aspects of the present disclosure.
Figure 3A:
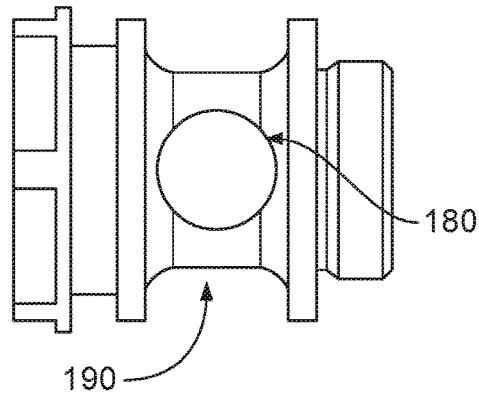
FIGS. 3A, 3B and 3C illustrate an external view of a first side, an external view of a second side and a perspective external view, respectively, of a bulkhead penetrator in accordance with aspects of the present disclosure.
Figure 3C:
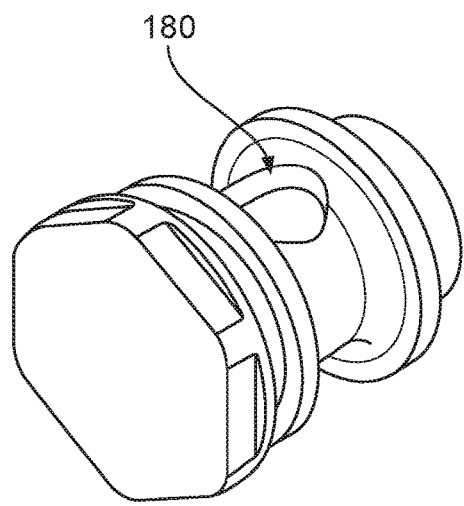
Figure 3B:
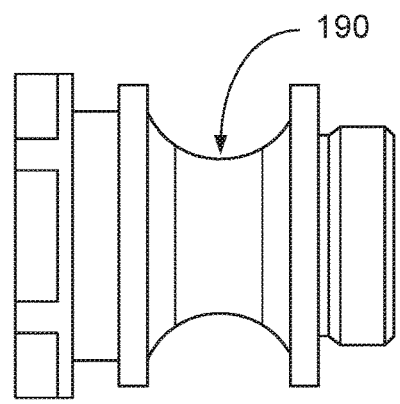
Figure 4:
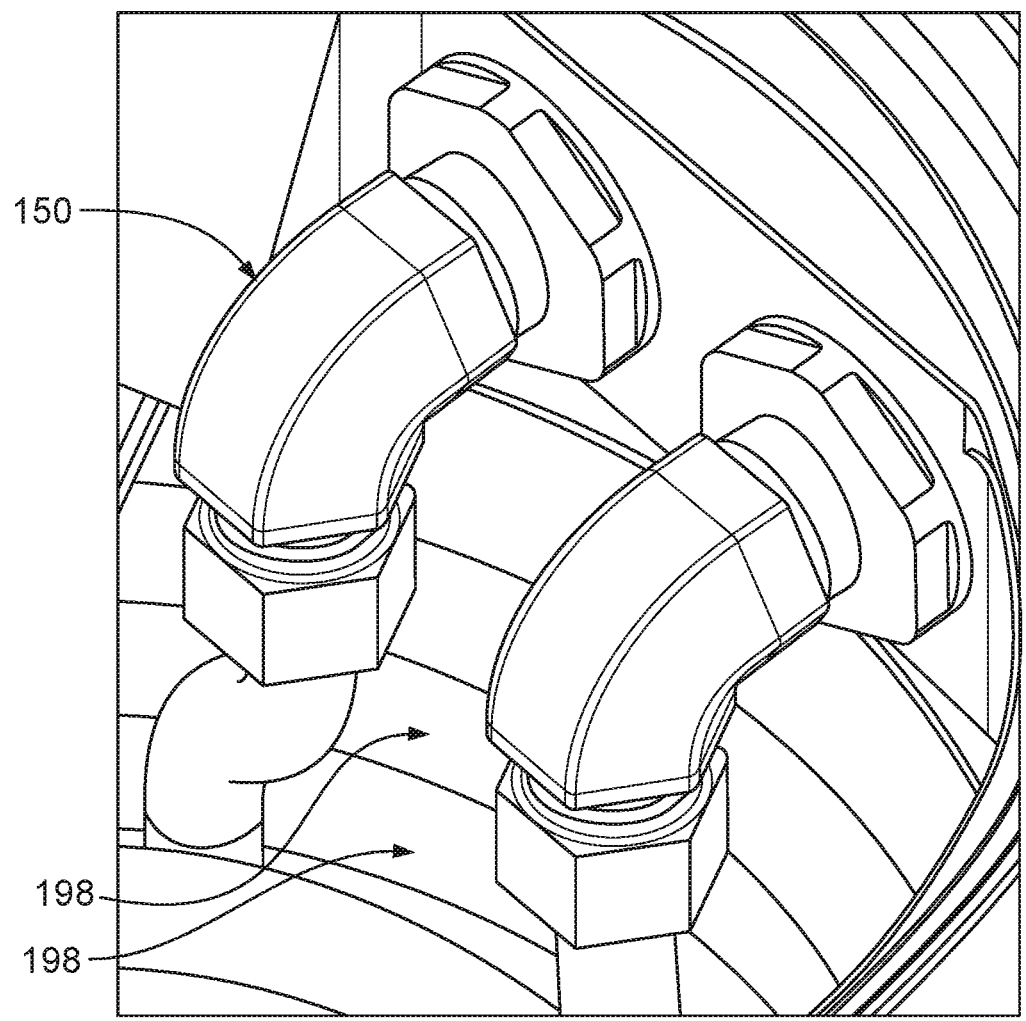
FIG. 4 illustrates an external view of a bulkhead penetrator in accordance with aspects of the present disclosure.

Referring now to FIGS. 1A through 4 together, illustrated, respectively are views of a bulkhead penetrator in accordance with aspects of the present disclosure. More particularly, FIG. 1A illustrates a cutaway view of a bulkhead penetrator in accordance with aspects of the present disclosure. FIG. 1B illustrates another cutaway view of the bulkhead penetrator of FIG. 1A in accordance with aspects of the present disclosure. FIG. 2 illustrates a close-up view of a pressure vessel, an outer penetrator and an input-output path in accordance with aspects of the present disclosure. FIGS. 3A, 3B and 3C illustrate an external view of a first side, an external view of a second side and a perspective external view, respectively, of a bulkhead penetrator in accordance with aspects of the present disclosure. FIG. 4 illustrates an external view of a bulkhead penetrator in accordance with aspects of the present disclosure.

The bulkhead penetrator 100 comprises a body 105 having an interior surface and an exterior surface. An element 107 is disposed within the interior surface of the body 105 in a first pressure region. The element 107 has a first pressure. The element 107 may be a fluid such as a working fluid or any other element that can be passed through such a bulkhead penetrator 100 to transfer from the exterior of the body of outer penetrator 140 that communicates directly with the working fluid to the interior surface of the body of outer penetrator 140 through a third pressure region having a third pressure. The present bulkhead penetrator can accommodate working fluids on both sides. For purposes of the present disclosure, "fluid" includes liquid, gas and plasma.

The bulkhead penetrator 100 also includes sealing mechanisms 110, such as O-rings, for the body 105. Sealing mechanisms 110 are configured to prevent the transfer of element 107 between the first pressure region 112 (indicated by horizontal cross-hatching), the second pressure region 114 (indicated by vertical cross-hatching) and the third pressure region 116 (indicated by both horizontal and vertical cross-hatching). The sealing mechanisms 110 may be one or more O-rings. A minimum of one sealing mechanism 110 is needed if the interior of the bulkhead penetrator 100 can be made to have the same pressure as in either the second pressure region 114 or the third pressure region 116. In the present illustrations, there are two sealing mechanisms 110. This will allow three different pressure volumes in the first pressure region 112, the second pressure region 114, and the third pressure region 116. Thus, the present bulkhead penetrator 100 could itself have an internal pressure different from the pressure in the physical boundary 120 or an ambient pressure in the ambient environment. The present bulkhead penetrator 100 can be made to withstand external pressure, seawater depth, or a vacuum.

A physical boundary 120 such as a pressure vessel may be provided between the interior of the body 105 and the exterior of the body 105. The bulkhead penetrator 100 may be used to penetrate the physical boundary 120, which may be designed to hold an internal pressure or a vacuum. In lieu of the pressure vessel shown, the physical boundary 120 may also be, e.g., a wall, a positive pressure room, a boat hull, or an airplane cabin. The element 107 may be a gas or liquid, including air, steam, a caustic chemical or ocean water. The element 107 may also be a fluid that has a cooling effect on other components that the element 107 it touches.

The bulkhead penetrator 100 may be used to orient the angles of elbowed or keyed connections. The present bulkhead penetrator 100 may be fitted on one end with a keyed or directional feature. For example, the keyed or directional feature may be an inner-outer connector 130 with a ninety degree (90°) back shell or an elbow pipe fitting. An inner-outer connector 130 connects an outer penetrator 140, via e.g., keyed feature 150, to an inner penetrator 160. The inner-outer connector 130 may be locked so that the inner penetrator 160 moves with the outer penetrator 140. In lieu of the inner-outer connector 130, there may be a keyed feature such as a pipe, connector, nozzle, or other element that will need to be oriented a certain way. The keyed feature may be attached to either the inner penetrator 160 or the outer penetrator 140. Rotating either the inner penetrator 160 or the outer penetrator 140 may cause the keyed feature to also rotate because the inner penetrator 160 and the outer penetrator 140 are mated. As shown, rotation can be accomplished by rotating the inner-outer connector 130 or the outer penetrator 140. The element 107 may be a fluid, e.g., a working fluid or any other element that can be passed through such a bulkhead penetrator 100 to transfer from the exterior surface of the body of outer penetrator 140 that communicates directly with the working fluid to the interior surface of the body of outer penetrator 140 through a third pressure region 116 having a third pressure.

The inner penetrator 160 is presented to element 107 in the first pressure region 112. Element 107 may be a working fluid. The outer penetrator 140 is presented to the ambient environment or adjacent chamber in a second pressure region 114 or a third pressure region 116.

Inner penetrator 160 is configured to permit a transfer of element 107 from the interior wall of the body 105 past the physical boundary 120 to the exterior wall of the body 105 in a second pressure region 114 having a second pressure, the inner penetrator 160 being further configured to be presented to, or exposed to, element 107. The inner penetrator 160 has an inner surface that is exposed to the first pressure region 112. The inner penetrator also has an exterior surface that is exposed to the second pressure region 114.

An outer penetrator 140 is configured to permit the transfer of element 107 in the first pressure region 112 from the interior of the body 105 past the physical boundary 120 to the exterior of the body in the third pressure region 116 which has a third pressure.

The present bulkhead penetrator 100 may be swiveled during operation, while under pressure. The inner penetrator 160 and outer penetrator 140 may be configured to be independently swiveled from each other. More specifically, the outer penetrator 140 is configured to be independently swiveled from the inner penetrator 160. Likewise, the inner penetrator 160 is configured to be independently swiveled from the outer penetrator 140.

The bulkhead penetrator also includes an input/output port 170 disposed on the body 105, the input/output port 170 being configured to receive the element 107. The input/output port 170 may have a threaded connection, or other possible paths. The lower arrow in FIG. 1A points to a connection possibility that will not turn and the right arrow in FIG. 1A points to a connection possibility that would turn.

The first pressure region 112, the second pressure region 114, and the third pressure region may be at first, second and third pressures, respectively. The first pressure region 112 is in the interior of body 105. The second pressure region and/or the third pressure region may be underwater or a vacuum.

A flow hole 180 is provided for fluid application. This flow hole 180 will allow transfer of fluid from the axial hole to the radial scallop. This is not necessary if the input/output port 170 is on the outer penetrator 140, and of the right arrow input/output port 170.

A flow scallop 190 is provided for fluid applications. The flow scallop 190 feature will allow transfer of fluid from the axial hole to the radial scallop which can then be ported out as in the lower arrow input/output port 170.

In use, the bulkhead penetrator 100 may be positioned on the physical boundary 120, either as part of a pressure vessel or threaded into the pressure vessel. The bulkhead penetrator 100 can form a penetration for electrical connectors that cannot survive the environment on their back side, i.e. two connectors, one facing out that can survive ambient, and one facing in that can survive the working fluid, and additionally allow for a ninety degree (90°) back shell to be oriented correctly.

As shown in FIG. 4, the bulkhead penetrator can allow for a second element—for example, another working fluid, such as cooling water for cooling coils 198 positioned inside—that will not mix with either ambient or the working fluid, and make assembly to a coil easier by allowing rotation of the connection end. The present bulkhead penetrator 100, as shown in FIGS. 1A and 1B could also be used to provide a passage where working fluid can be added, say for a directional nozzle.

Though the present bulkhead penetrator 100 is similar to swivel devices that are available, there are several key features that make it unique. Commercially available swivels are not designed to mount in a bulkhead, therefore cannot be made compact for tight spaces. The present bulkhead penetrator 100 has different halves. Other bulkhead designs could have giant threaded screw with nut. The two may connect inside the wall rather than being disposed outside the wall.

Commercially available penetrators may not allow for independent swivel. Commercially available penetrators that can provide electrical pass-through, are not typically rated for pressure and working fluids on both sides, therefore commercial standard connectors cannot be employed.

Commercially available penetrators may not have the capacity for an independent environment, say oil filled or vacuum, inside the penetrator itself.

As alternatives the bulkhead penetrator of FIG. 1A though FIG. 4, bulkhead penetrator 100 can be made to be self-containing and simply thread into an existing bulkhead port. The present bulkhead penetrator 100 could also be built into a bulkhead.

As a non-limiting example, the present bulkhead penetrator 100 can be low profile, or compact. The features of the present bulkhead penetrator 100 can also be expanded for large requirements. It can share pressure conditions with either a pressure vessel or ambient environment.

It can be locked down so that it does not swivel during operation. Otherwise, it could be swiveled during operation, if desired. The utility of this device does not depend on the need for keyed features.

Multiple penetrations can be made with a single device, such as multiple connectors on a single penetration or several entrance or exit apertures on either face.

This bulkhead penetrator 100 can be made to have multiple redundant O-rings.

This bulkhead penetrator 100 can be made from a material that isolates connectors or fittings from the pressure vessel. For example, using plastic as a material can remove the galvanic corrosion between a brass connector and an aluminum pressure vessel.

This bulkhead penetrator 100 can be made with retaining rings or other press-in means instead of a threaded connection such that either the inner penetrator or outer penetrator can rotate independently.

Figure 5:
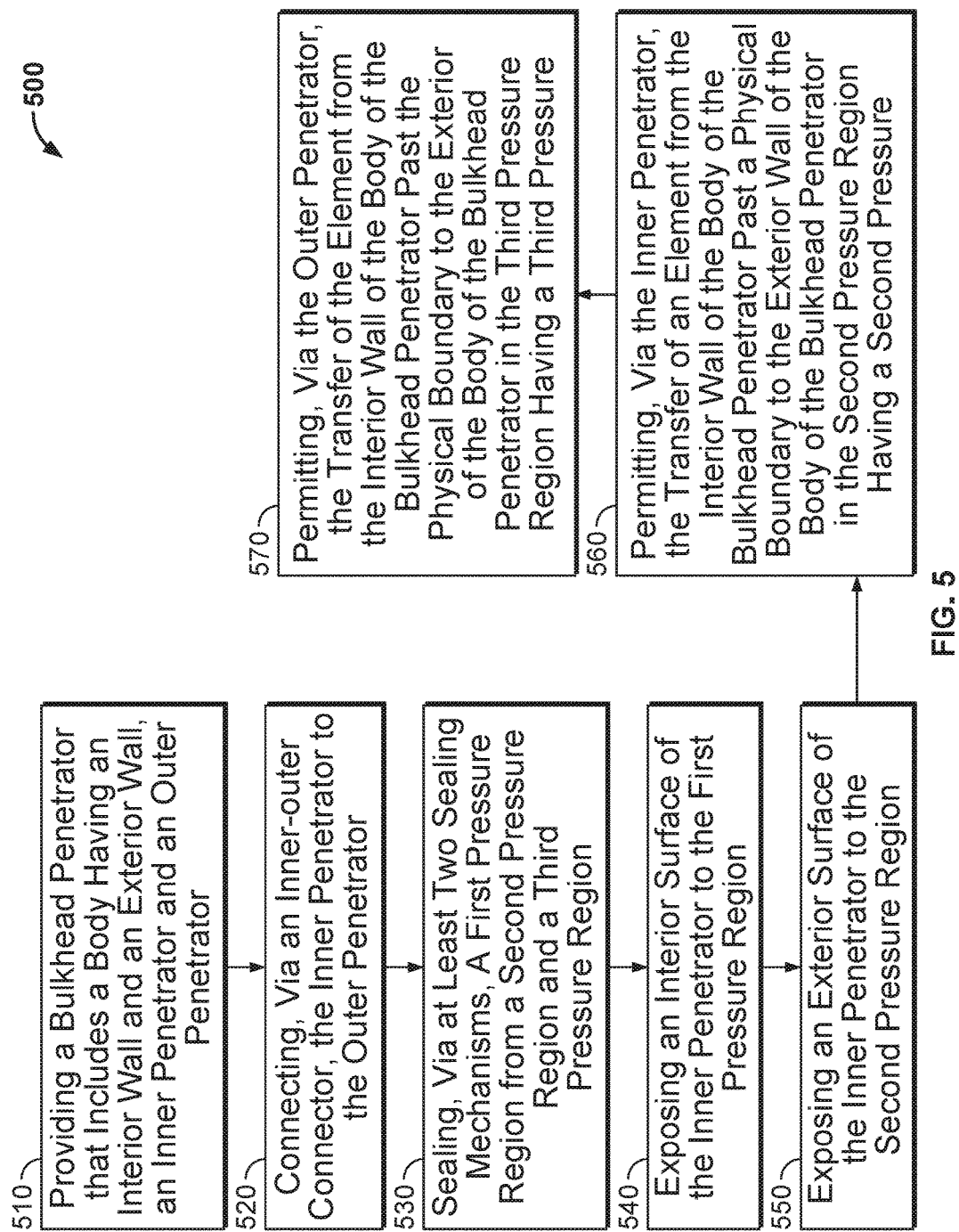
FIG. 5 illustrates method for penetrating a bulkhead in accordance with aspects of the present disclosure.

Referring now to FIG. 5, illustrated are steps of a method 500 for penetrating a bulkhead in accordance with aspects of the present disclosure. At step 510, the method includes providing a bulkhead penetrator that includes a body having an interior wall and an exterior wall, an inner penetrator and an outer penetrator. At step 520, the method includes connecting, via an inner-outer connector, the inner penetrator to the outer penetrator. At step 530, the method includes sealing, via at least two sealing mechanisms, the first pressure region from the second pressure region and the third pressure region.

At step 540, the method includes exposing an interior surface of the inner penetrator to a first pressure region. At step 550, the method includes exposing an exterior surface of the inner penetrator to a second pressure region. At step 560, the method includes permitting, via the inner penetrator, the transfer of an element from the interior wall of the body of the bulkhead penetrator past a physical boundary to the exterior wall of the body of the bulkhead penetrator in a second pressure region having a second pressure. At step 570, the method includes permitting, via the outer penetrator, the transfer of the element from the interior wall of the body of the bulkhead penetrator past the physical boundary to the exterior of the body of the bulkhead penetrator in a third pressure region having a third pressure.

The foregoing description of various embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A bulkhead penetrator, comprising:
    a body having an interior wall and an exterior wall;
    an element disposed within the interior wall of the body in a first pressure region, the element having a first pressure;
    an inner penetrator configured to permit a transfer of the element from the interior wall of the body past a physical boundary to the exterior wall of the body in a second pressure region having a second pressure, the inner penetrator having an interior surface exposed to the first pressure region and an exterior surface exposed to the second pressure region;
    an outer penetrator, wherein the outer penetrator is configured to permit the transfer of the element from the interior wall of the body past the physical boundary to the exterior wall of the body in a third pressure region having a third pressure;
    an inner-outer connector that connects the inner penetrator to the outer penetrator; and
    at least two sealing mechanisms for the body, the at least two sealing mechanisms being configured to seal the first pressure region from the second pressure region and the third pressure region.

2. The bulkhead penetrator of claim 1, wherein the physical boundary is a pressure vessel.

3. The bulkhead penetrator of claim 1, wherein the inner-outer connector is locked so that the inner penetrator moves with the outer penetrator.

4. The bulkhead penetrator of claim 1, wherein the inner penetrator is configured to be independently swiveled from the outer penetrator.

5. The bulkhead penetrator of claim 1, wherein the outer penetrator is configured to be independently swiveled from the inner penetrator.

6. The bulkhead penetrator of claim 1, further comprising:
    an input/output port disposed on the body, the input/output port being configured to receive the element, and wherein the element is a first fluid.

7. The bulkhead penetrator of claim 1, wherein the first pressure is different from the second pressure and the third pressure.

8. The bulkhead penetrator of claim 1, wherein the second pressure region and/or the third pressure region is underwater.

9. The bulkhead penetrator of claim 1, wherein the second pressure region and/or the third pressure region is a vacuum.

10. A method, comprising:
    providing a bulkhead penetrator that includes a body having an interior wall and an exterior wall, an inner penetrator and an outer penetrator;
    connecting, via an inner-outer connector, the inner penetrator to the outer penetrator;
    sealing, via at least two sealing mechanisms, a first pressure region from a second pressure region and a third pressure region;
    exposing an interior surface of the inner penetrator to the first pressure region;
    exposing an exterior surface of the inner penetrator to the second pressure region;

permitting, via the inner penetrator, the transfer of an element from the interior wall of the body of the bulkhead penetrator past a physical boundary to the exterior wall of the body of the bulkhead penetrator in a second pressure region having a second pressure; and
permitting, via the outer penetrator, the transfer of the element from the interior wall of the body of the bulkhead penetrator past the physical boundary to the exterior of the body of the bulkhead penetrator in a third pressure region having a third pressure.

11. The method of claim 10, wherein the physical boundary is a pressure vessel.

12. The method of claim 10, further comprising:
locking, via the inner-outer connector, the inner penetrator to the outer penetrator so that the inner penetrator moves with the outer penetrator.

13. The method of claim 10, further comprising:
independently swiveling the inner penetrator from the outer penetrator.

14. The method of claim 10, further comprising:
independently swiveling the outer penetrator from the inner penetrator.

15. The method of claim 10, further comprising:
receiving, via an input/output port disposed on the body, the element, wherein the element is a first fluid.

16. The method of claim 10, wherein the first pressure region has a first pressure that is different from the second pressure and the third pressure.

17. The method of claim 10, wherein the second pressure region and/or the third pressure region is underwater.

18. The method of claim 10, wherein the second pressure region and/or the third pressure region is a vacuum or a working fluid.

19. A bulkhead penetrator, comprising:

a body having an interior wall and an exterior wall;

a first fluid disposed within the interior wall of the body in a first pressure region, the first fluid having a first pressure;

an inner penetrator configured to permit a transfer of the first fluid from the interior wall of the body past a pressure vessel to the exterior wall of the body in a second pressure region having a second pressure, the inner penetrator having an interior surface exposed to the first pressure region and an exterior surface exposed to the second pressure region;

an outer penetrator, wherein the outer penetrator is configured to permit the transfer of fluid from the interior wall of the body in the first pressure region past the pressure vessel to the exterior wall of the body in a third pressure region having a third pressure;

an inner-outer connector that connects the inner penetrator to the outer penetrator; and at least two sealing mechanisms for the body, the at least two sealing mechanisms being configured to seal the first pressure region from the second pressure region and the third pressure region, wherein the first pressure is different from the second pressure and the third pressure, and wherein the second pressure region and/or the third pressure region is underwater.

20. The bulkhead penetrator of claim 1, wherein the outer penetrator and inner penetrator are configured to be independently swiveled from each other.

* * * * *